Figure 1:
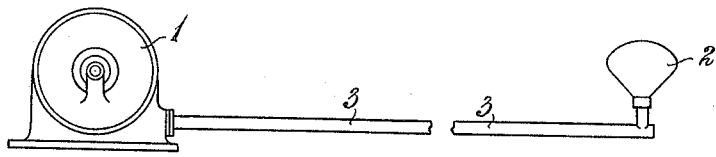

C. HOLZ.
APPARATUS FOR PREVENTING AND REMOVING DEPOSIT OF MOISTURE ON WINDOWS, &c.
APPLICATION FILED OCT. 29, 1912.

1,158,218.

Patented Oct. 26, 1915.

WITNESSES:
John C. Sanders
Albert F. Henman

INVENTOR:
Carl Holz
BY
ATTY.

UNITED STATES PATENT OFFICE.

CARL HOLZ, OF FULHAM, ENGLAND.

APPARATUS FOR PREVENTING AND REMOVING DEPOSIT OF MOISTURE ON WINDOWS, &c.

1,158,218. Specification of Letters Patent. Patented Oct. 26, 1915.

Application filed October 29, 1912. Serial No. 728,513.

*To all whom it may concern:*

Be it known that I, CARL HOLZ, a subject of the King of Great Britain and Ireland, residing at 48 Doneraile street, Fulham, in the county of Middlesex, England, have invented new and useful improvements in apparatus for preventing and removing deposit of moisture on windows and other glass surfaces and for other purposes, of which the following is a specification.

This invention relates to apparatus for preventing the deposit of moisture on and for effecting the removal of deposited moisture from the windows of shops and restaurants, mirrors and other surfaces, and consists of improvements in that variety of said apparatus in which a current of air is distributed in such manner as to keep said surfaces clear or to clear said surfaces if moisture has been deposited thereon. The improved apparatus can also be adapted for the purpose of preventing flies reaching and settling upon food displayed in shop windows or in other exposed positions.

According to my invention the air current, obtained by means of a blower or fan driven by a suitable electric or other motor or by any other convenient means, is led through a pipe or pipes to an outlet or outlets situated preferably at one edge of the glass and close to its surface and consisting of a flattened nozzle or head of a contour resembling a cockle shell having a slit of the shape hereinafter described arranged parallel with the glass and extending for about a semi-circle along its periphery. The air is thus blown radially in a thin flat stream from the head or nozzle, and spreads over the surface of the glass. In the case of large windows two or more such nozzles or heads may be employed placed along one or more of the edges of the windows. If found desirable the nozzles or heads could be provided on one or both sides of their narrow slits with lips for directing the discharge of air. In certain cases the nozzles or heads may be placed well within the edges or at the middle of the glass and the slits extended to spread the thin stream of air in all directions.

The above described nozzles or heads could be used for the purpose of preventing flies reaching any food which may be displayed in exposed positions, as for example in the shops of confectioners and pastry cooks. In this case the air distributing device could be fitted behind and above the food, preferably under a shelf or in any other partly or wholly concealed position, so that a thin sheet of air is blown toward and against the window and forms an invisible barrier which the flies will not cross.

In order that my invention may be thoroughly understood I have annexed to this specification the accompanying drawings.

Figure 2:
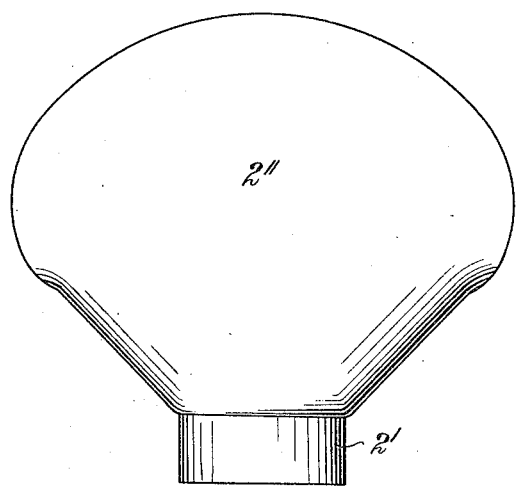

Of these drawings, Figure 1 is a side elevation illustrating the use of my invention. Fig. 2 is a side elevation, Fig. 3 an end view, Fig. 4 a plan and Fig. 5 a vertical section illustrating the shape of nozzle or head which I have found to give good results.

Referring first to the application of the invention shown in Fig. 1, 1 is a fan or blower, which may be driven by an electric motor or by belt from a suitably disposed shaft, 2 is a nozzle or head constructed according to the invention, and 3 is a pipe by means of which the air compressed by the fan or blower 1 is conveyed to the nozzle or head 2.

Figure 3:
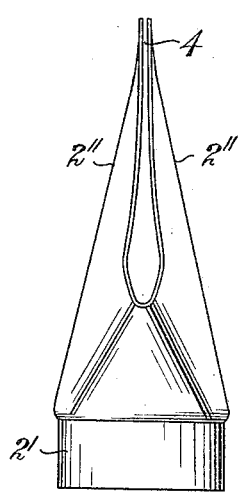
Figure 4:
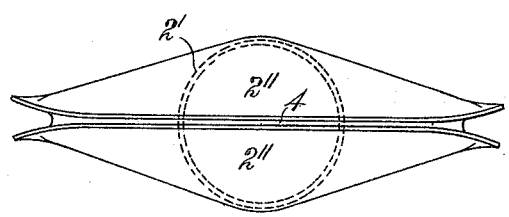
Figure 5:
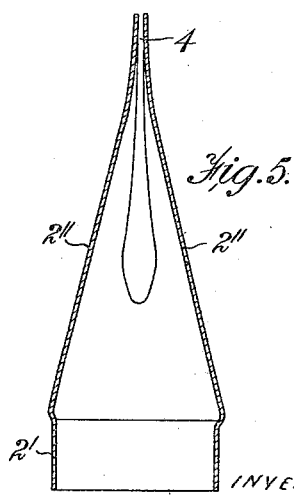

Referring now to Figs. 2 to 5 of the accompanying drawings each nozzle or head 2 consists of a sleeve 2' by which it may be mounted on the pipe 3 and of two side walls 2'' which constitute the nozzle or head proper. These side walls are made of the shape shown in Figs. 2 to 4 and merge into one another at their lateral extremities, but are at the remaining part of the periphery of the nozzle or head separate from one another so that their edges constitute an outlet orifice 4, the above referred to narrow slit, of the required length. This outlet orifice 4, which extends along the periphery of the nozzle or head 2 for about a semi-circle, is made of the particular shape shown in the drawings, that is to say is made of uniform width for the greater part of its length, but is enlarged toward its ends, as shown most clearly in Figs. 3 and 5, so as to insure the proper distribution of the compressed air at all parts of the outlet 4. The increase of width at the extremities of the outlet 4 is preferably somewhat pronounced, as shown in Figs. 3 and 5, so as to insure the issue therefrom of a somewhat greater volume of compressed air than that issuing from the rest of the outlet. Further, as will be seen from an inspection of Figs. 3 and 5, the side walls 2'' of the nozzle or head 2 are arranged so as to gradually converge toward the outlet 4 and thereby act as guides for properly directing the compressed air toward the outlet 4.

The application of the invention is not confined to the instance shown in Fig. 1, which is only one example of many uses.

As already mentioned any desired number of nozzles or heads could be used and be supplied with compressed air from one or more fans or blowers. Further the fan, blower or blowers could be replaced by any other source or sources of compressed air.

Having now described my invention what I have invented and desire to secure by Letters Patent in the United States is as follows:—

1. In an apparatus for the purpose described herein, in which compressed air is used, a distributing nozzle having a straight shank and a flaring mouth portion comprising opposing walls, having curved edges spaced apart to provide an arcuate slot extending laterally from the axis of the shank to equal extents in both directions, the said edges being arranged parallel medially of said slot and diverging adjacent to the ends thereof.

2. In an apparatus for the purpose described herein, in which compressed fluid is used, a distributing nozzle having a straight shank and a laterally flaring mouth portion comprising longitudinally converging opposing walls having semi-elliptical edges spaced apart to provide an arcuate slot extending laterally from the axis of the shank to equal extents in both directions, the said edges diverging toward the ends of said slot.

In testimony whereof I have signed my name to this specification in the presence of two subscribing witnesses.

CARL HOLZ.

Witnesses:
 CHARLES FLETCHER ENNIS,
 O. J. WORTH.

Copies of this patent may be obtained for five cents each, by addressing the "Commissioner of Patents, Washington, D. C."